US007831982B2

(12) United States Patent
Smirnov et al.

(10) Patent No.: US 7,831,982 B2
(45) Date of Patent: Nov. 9, 2010

(54) SERVICE AGGREGATION IN A SERVICE ORIENTED ARCHITECTURE

(75) Inventors: Dmitri Smirnov, Munich (DE); Ralf Schroeder, Heimstetten (DE)

(73) Assignee: Oracle International Corporation, Redwood Shores, CA (US)

( * ) Notice: Subject to any disclaimer, the term of this patent is extended or adjusted under 35 U.S.C. 154(b) by 1390 days.

(21) Appl. No.: 11/280,847

(22) Filed: Nov. 15, 2005

(65) Prior Publication Data
US 2007/0113238 A1    May 17, 2007

(51) Int. Cl.
G06F 3/00      (2006.01)
G06F 9/44      (2006.01)
G06F 9/46      (2006.01)
G06F 15/16     (2006.01)

(52) U.S. Cl. .................. 719/330; 709/201; 709/202; 709/203

(58) Field of Classification Search ............. 719/330; 709/201–203
See application file for complete search history.

(56) References Cited

U.S. PATENT DOCUMENTS 7,096,226 B2 * 8/2006 Brock et al. ................... 1/1
2006/0143225 A1 * 6/2006 Brendle et al. .......... 707/103 R

OTHER PUBLICATIONS

"Extensible Markup Language (XML) 1.0 (Third Edition)" Copyright 2004 W3C, retrieved from www.w3.org/TR/2004/REC-xml-20040204, 41 pages.
"SOAP Version 1.2 Part 1: Messaging Framework" Copyright 2003 W3C, retrieved from www.w3.org/.../REC-soap12-part1-20030624/, 49 pages.
"SOAP Version 1.2 Part 2: Adjuncts" Copyright 2003 W3C, retrieved from www.w3.org/.../REC-soap12-part2-20030624/, 21 pages.
"Web Service Description Language (WSDL) 1.1" Copyright 2001, retrieved from www.w3.org/TR/wsdl, 35 pages.

* cited by examiner

*Primary Examiner*—Hyung S Sough
*Assistant Examiner*—Qing Wu
(74) *Attorney, Agent, or Firm*—Hickman Palermo Truong & Becker LLP (57) ABSTRACT

Various techniques for processing service operations and for developing a service interface in a service oriented data architecture are provided. When processing a service request, a first service implementation is executed in a first operation mode. The first service implementation calls at least one second service implementation, which is executed in a second operation mode. When developing a service interface, at least one aggregated service object and at least one aggregated service operation are defined, the aggregated service operation using the aggregated service object such that the aggregation structure of the aggregated service operation matches the aggregation structure of the aggregated service object.

16 Claims, 6 Drawing Sheets

| ▼ TYPE SCHEMA | | | | | | |
|---|---|---|---|---|---|---|
| SEQ. NR. | ELEMENT NAME | TYPE CATEGORY | SIMPLE TYPE | COMPLEX TYPE | MINIMUM OCCURRENCES | MAXIMUM OCCURRENCES |
| 1 | T1 | SIMPLE ▶ | XSD:DECIMAL ▶ | | 1 ▶ | 1 ▶ | + | − |
| 2 | T2 | SIMPLE ▶ | XSD:DATE ▶ | | 0 ▶ | 1 ▶ | + | − |
| 3 | T3 | COMPLEX ▶ | | ListItemType 🔍 | 0 ▶ | UNBOUNDED ▶ | + | − |

Fig. 4

▼ DO SERVICE REQUEST

| SEQ. NR. | ELEMENT NAME | TYPE CATEGORY | SIMPLE TYPE | COMPLEX TYPE | | | |
|---|---|---|---|---|---|---|---|
| 1 | F1 | SIMPLE ▼ | XSD:DECIMAL ▼ | | | + | − |
| 2 | F2 | COMPLEX ▼ | | ListItemType | 🔍 | + | − |

▼ DO SERVICE RESPONSE

| SEQ. NR. | ELEMENT NAME | TYPE CATEGORY | SIMPLE TYPE | COMPLEX TYPE | | |
|---|---|---|---|---|---|---|
| 1 | F3 | SIMPLE ▼ | XSD:STRING ▼ | | + | − |

▼ EXCEPTIONS

| SEQ. NR. | ELEMENT NAME | COMPLEX TYPE | | | |
|---|---|---|---|---|---|
| 1 | | | 🔍 | + | − |

▼ WARNINGS

| MESSAGE | DESCRIPTION |
|---|---|

| SEQ. NR. | SET | MSG | MESSAGE TEXT | | |
|---|---|---|---|---|---|
| 1 | 🔍 | 🔍 | | + | − |

SERVICE AGGREGATION IN A SERVICE ORIENTED ARCHITECTURE

FIELD OF THE INVENTION

The invention relates in general to service oriented data processing architectures, which are also known as service oriented architectures or SOAs. More specifically, the invention relates to techniques for providing services with an appropriate level of granularity in a service oriented architecture.

BACKGROUND OF THE INVENTION

In recent years, service oriented architectures have gained wide-spread acceptance. Service oriented architectures are data processing architectures based on interacting components. These components may be physical components (e.g., computers) and/or logical components (e.g., software modules running within a multitasking environment). Communication between the components may be provided by any communication mechanism, which may include a global network (e.g., the Internet), or an enterprise-wide network (e.g., an Intranet), or a local network, or a data communication mechanism within a single computer.

The components of a service oriented architecture interact through services. A service is usually considered as a function that receives requests and returns responses via a well-defined interface. In many systems, the services (or some of the services) process each request without having regard to other (earlier or concurrent) processing operations of the same or other services. This property is often called "statelessness", although it should be understood that a stateless service may access and change a database or another local or shared data repository, thus influencing future processing operations of the same or other services. The application services in a service oriented architecture tend to be loosely coupled and highly interoperable.

A service oriented architecture can generally be used for all kinds of data processing tasks, but a preferred field of application is the support of business processes. Especially in this field, the technology of service oriented architectures has made significant progress in recent years and has now reached a level of maturity that allows the support of large scale enterprise business applications.

A decisive factor in the success of any service oriented development effort is that the right granularity must be found for the service interfaces. If the service interfaces are too fine grained, then the overall system performance will suffer because too many service calls are required to complete a task, e.g., a business task. Furthermore, a large number of fine grained services will be needed, and it becomes difficult to manage them. On the other hand, if a service interface is too coarse grained, then too much data is exposed. The service interface will then need to be adjusted whenever any element of its data changes. This leads to an unstable interface.

The challenge therefore is to find service interfaces of a suitable granularity in order to meet the requirements of high stability, high performance and good support for the respective business applications. This challenge is further complicated by the fact that the "right" granularity not only depends on the particular business application, but also on the communication structure between the components of the service oriented architecture. Coarse-grained service interfaces are more appropriate for the communication between remote nodes (i.e., nodes in different address spaces), while a small granularity ("chatty communication") is better suited for local nodes that have little communication overhead.

A common approach to solving the problem of providing suitable service interfaces is to build service interfaces of various different granularities as independent services. However, this approach requires a duplication of code and thus increases the effort and costs for programming and supporting a service application.

Another common approach is to offer only coarse grained services and let the service requester extract the required data. However, as mentioned above, this approach leads to performance degradation and produces an overwhelming amount of information that must be transferred to and processed by the service requester.

In some systems it is possible to call another service from within a given service implementation. This functionality may be used to implement ad hoc solutions in a non-systematic way. Because there is no supporting service framework, much overhead will usually be incurred, thus leading to inefficient services.

Another difficulty in designing service interfaces of a suitable granularity is to provide a systematic way of organizing service objects, i.e., service operation parameters.

Based on the foregoing, there is clearly a need for a mechanism that supports the developer and/or user in providing a service interface with a suitable degree of granularity. There is also a need for providing a systematic way for aggregating service objects, service interfaces and/or service implementations. There is further a need for a technique that allows efficient execution of aggregated service implementations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings in which.

DETAILED DESCRIPTION OF EXEMPLARY EMBODIMENTS OF THE INVENTION

A method, apparatus and computer-readable medium for performing service operations and for developing service interfaces are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The present specification will use some examples taken from the field of human capital management (human resource management), but it is apparent that the present invention can be used, and is intended to be used, for various other business processes or for other general data processing tasks of all kinds.

Performing Service Operations

Figure 1:
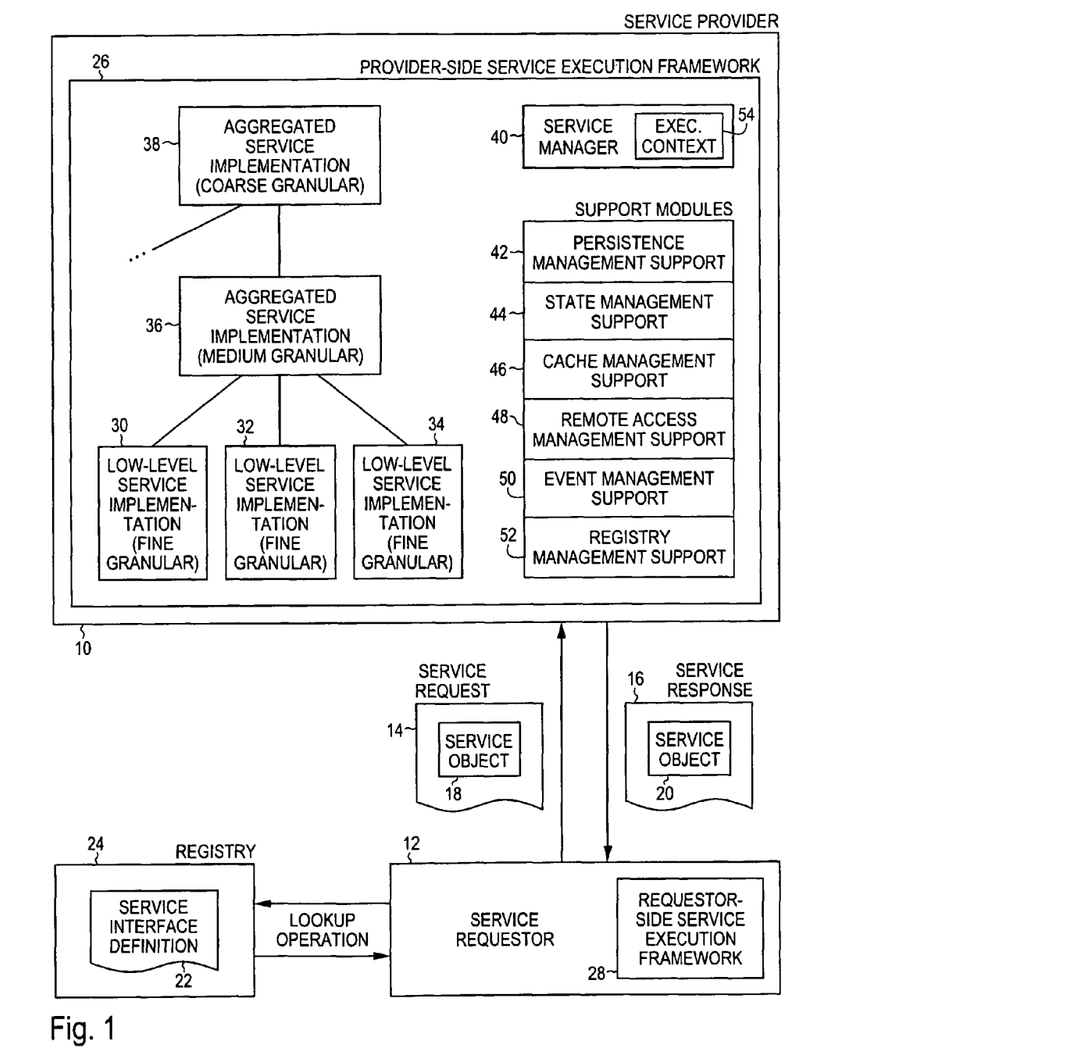
FIG. 1 shows a schematic overview of a system according to an embodiment of the present invention, the system comprising a service provider and a service requester.

FIG. 1 shows an overview of a system in which an embodiment of the present invention is implemented. The example of FIG. 1 concerns a service provider 10 and a service requestor 12. The service provider 10 and the service requester 12 are nodes of a service oriented architecture and may exchange information via a suitable data communication mechanism. In many implementations, further nodes will be present, acting as further service providers and/or service requestors. In fact, there may be tens or hundreds or thousands of nodes since the paradigm of a service oriented architecture is especially suited for large, loosely-coupled network structures.

In many embodiments, the service provider 10 and the service requestor 12 are computers (e.g., server computers or workstations) that are connected in a network. In many cases, but not necessarily, the network is the Internet or an Intranet, and the protocols commonly associated with such networks (e.g., TCP/IP) will be used. However, the service provider 10 and the service requester 12 may also be software modules running on a single computer and exchanging data via a message passing mechanism that is provided by the operating system.

The service provider 10 offers a number of service operations to the service requestor 12 and other service requesters (not shown). In each service operation, a service request 14 that is issued by the service requestor 12 is received by the service provider 10. The service provider 10 processes the service request 14 and returns a service response 16. The service response 16 is transmitted back to the service requestor 12.

Service objects 18, 20 are used as parameters passed to and from the service operations. These service objects 18, 20 act as data containers. In the example shown in FIG. 1, the service object 18 is part of the service request 14 and contains the data passed to the service operation, while the service object 20 is part of the service response 16 and contains the results of the service operation.

The system shown in FIG. 1 conforms to various standards and de facto standards that have been developed in the field of service oriented architectures. These standards include XML, SOAP and WSDL. XML (Extensible Markup Language) is a markup language that can form the basis for describing data in a variety of different domains. SOAP is a protocol for exchanging XML based messages. WSDL (Web Service Description Language) is an XML format for describing the public interface (e.g., the message formats and the supported operations) of a service.

More information about XML, SOAP and WSDL are given in the documents "Extensible Markup Language (XML) 1.0 (Third Edition)", W3C Recommendation 04 Feb. 2004; "SOAP Version 1.2 Part 1: Messaging Framework", W3C Recommendation 24 Jun. 2003; "SOAP Version 1.2 Part 2: Adjuncts", W3C Recommendation 24 Jun. 2003; and "Web Service Description Language (WSDL) 1.1", W3C Note 15 Mar. 2001. These and other pertinent documents are available from the World Wide Web Consortium, at MIT, Cambridge, U.S.A., on the World Wide Web at the domain "w3" and the extension ".org". The contents of the above-referenced documents are incorporated herein in their entirety.

In the example shown in FIG. 1, the communication between the service provider 10 and the service requestor 12 takes place according to one of the messaging patterns defined in SOAP, namely the SOAP remote procedure call (RPC) pattern. Furthermore, the service interface offered by the service provider 10 is defined as a WSDL service interface definition 22. The service interface definition 22 is contained in a registry 24 that can be accessed by the service requestor 12 and other service requesters (not shown) in a lookup operation.

As an example of the operation of the system shown in FIG. 1, the service provider 10 offers a number of low level service operations including the service operations GetPersonName, GetPersonAddress and GetPersonEmail as separate operations. These operations use corresponding low level service objects as data containers. For example, the low level service operation GetPersonName returns a low level service object called PersonName, the operation GetPersonAddress returns a service object called PersonAddress, and the operation GetPersonEmail returns a service object called PersonEmail. The service provider 10 further offers a higher level service called GetPerson, which returns a service object called Person.

It is an important feature of the present embodiment that this higher level service operation GetPerson is obtained by aggregating the constituent low level service operations GetPersonName, GetPersonAddress and GetPersonEmail. This aggregation of the service operation matches with a corresponding aggregation of the service objects. Thus, in the present example, the aggregated service object Person is a composite of the service objects PersonName, PersonAddress and PersonEmail.

A similar matching exists with respect to the implementation of the aggregated service operation GetPerson, in which the already existing implementations of the low level service operations GetPersonName, GetPersonAddress and GetPersonEmail are used. For example, the existing implementation of the operation GetPersonName is used to populate the constituent part PersonName of the aggregated service object Person, the implementation of the service operation GetPersonAddress is used to populate the address field of the aggregated service object Person, and the implementation of the operation GetPersonEmail is used to populate the email field of the service object Person.

Again, the aggregation structure of the service operations matches the aggregation structure of the service objects. In other words, the aggregation of service operations is driven by the relationship of the aggregated service objects used as parameters for these operations. Both aggregations are defined by a service interface definition such as the service interface definition 22.

The system shown in FIG. 1 comprises a provider-side service execution framework 26 implemented at the service provider 10 and a requestor-side service execution framework 28 implemented at the service requester 12. The requestor-side service execution framework 28 provides auxiliary functions like, e.g., local cache management and registry access. The provider-side service execution framework 26 comprises a number of service implementations 30-38 and provides further functions for processing the incoming service requests 14.

FIG. 1 shows low level and aggregated service implementations. The low level or non-aggregated service implementations 30-34 provide fine granular services like, for example, the non-aggregated service operations GetPersonName, GetPersonAddress and GetPersonEmail mentioned above. The aggregated service implementations 36, 38 provide medium and coarse granular services like, for example, the aggregated service operation GetPerson mentioned above.

In the present sample embodiment, aggregated service implementations may use non-aggregated and/or aggregated service implementations as their building blocks. For example, the medium grained aggregated service implementation 36 in FIG. 1 calls the non-aggregated service implementations 30-34, and the coarse grained aggregated service implementation 38 in FIG. 1 calls the medium grained aggregated service implementation 36 and other (aggregated or non-aggregated) service implementations.

A service implementation can generally be executed in an aggregated or a non-aggregated operation mode. This dynamic run-time distinction is independent from the static classification of a service implementation as an aggregated or non-aggregated one. A service implementation is executed in the aggregated operation mode if it has been called by another, higher level, service implementation, and it is executed in the non-aggregated operation mode if it is executed in direct response to an incoming service request 14.

For example, the non-aggregated service implementation 30 runs in the non-aggregated operation mode when processing an incoming service request for the operation GetPersonName, and it runs in the aggregated operation mode when being called by the service implementation 36 that processes a service request for the operation GetPerson. The same two modes of operation are possible for the aggregated service implementation 36. Only the top level service operation 38 of the hierarchy shown in FIG. 1 can only run in the non-aggregated operation mode.

It is an important feature of the presently described embodiment that each service implementation 30-38 is aware of the possibility of aggregation. In other words, in each service implementation 30-38 appropriate provisions are taken to ensure correct and efficient operation no matter whether the service implementation 30-38 is (1) called in non-aggregated operation mode, i.e., called to process a service request 14 that requires exactly the service operation provided by the service implementation, or (2) called in aggregated operation mode, i.e., called from another, higher level service application. In some embodiments, more or less or different checks and optimizations are implemented in an aggregated service implementation 36, 38 than are implemented in a non-aggregated service implementation 30-34. Furthermore, embodiments are envisaged in which only the aggregated service implementations 36, 38 or only the non-aggregated service implementations 30-34 are aware of the possibility of aggregation.

In the present embodiment, several optimizations are performed in order to reduce the overhead of aggregation. Three particular areas in which optimizations are performed in the present example are tasks related to persistence management, transaction management and concurrency management. These three areas will be discussed in the following.

1. Persistence Management

If a fine granular (i.e., item-sized) operation is reused in an aggregated (i.e., collection-sized) operation to update an entire set of business or other object instances, it is not desirable to persist each instance individually as part of the lower level service operation. Instead, the entire collection should, once validated, be persisted in one shot. This avoids costly database roundtrips and prevents locking issues.

In order to implement this optimization, each service implementation checks whether or not it runs in aggregated operation mode. If a service implementation is executed in aggregated mode, then no persistence operations need to be performed. Only the single service implementation that runs in non-aggregated mode takes care of all persistence operations.

2. Transaction Management

All of the lower level service operations need to complete successfully in order to allow the high level operation to complete successfully. However, in most cases lower level service operations do not need to manage their own transactions; they are part of the transaction of the higher level operation. If a lower level operation requires its own transactional scope, it is most likely not a good candidate for aggregation and should potentially be called separately by the service requester.

In order to implement this optimization, each service implementation comprises code to check the current operation mode (i.e., aggregated or non-aggregated mode). Transaction management is only performed by the service implementation that runs in non-aggregated mode.

3. Concurrency Management

The management of concurrency can be done, for example, by checking if the data has been changed by someone in the course of the business transaction. In some embodiments, this is done by comparing the originally retrieved data with the state prior to committing the changes (optimistic offline lock). In embodiments in which this strategy for concurrency management is implemented, it should not be repeatedly applied in the service aggregation chain. Only the top level service implementation in the run-time aggregation chain should enforce the concurrency strategy. All other service implementations in this chain are part of the higher level scope.

Again, this optimization is implemented by checking the current mode of operation of a service implementation at run-time. All concurrency management checks will be skipped if the service implementation runs in the aggregated operation mode.

The above and other optimizations are implemented in the present sample embodiment with the help of a service manager 40 and a number of support modules 42-52, which are part of the provider-side service execution framework 26.

The service manager 40 is a singleton object that provides a number of centralized functions. In particular, the service manager 40 is accessed by all service implementations 30-38 to determine the operation mode (aggregate or non-aggregate) in which a service implementation 30-38 is executed. The service manager 40 maintains information about the respective operation modes and other pertinent information in an execution context 54, which is a data structure owned by the service manager 40.

The support modules 42-52 constitute a tool box with a number of basic building blocks for various standard system operations. All service implementations 30-38 are expected to make use of these support modules 42-52 in order to provide high efficiency and maintainability.

In the sample embodiment shown in FIG. 1, the support modules 42-52 comprise a persistence management support module 42, a state management support module 44, a cache management support module 46, a remote access management support module 48, an event management support module 50, and a registry management support module 52. The persistence management support module 42 supports the above-mentioned optimizations of persistence management and concurrency management. The state management support module 44 supports the above-mentioned optimizations of transaction management and also concurrency management.

Figure 2:
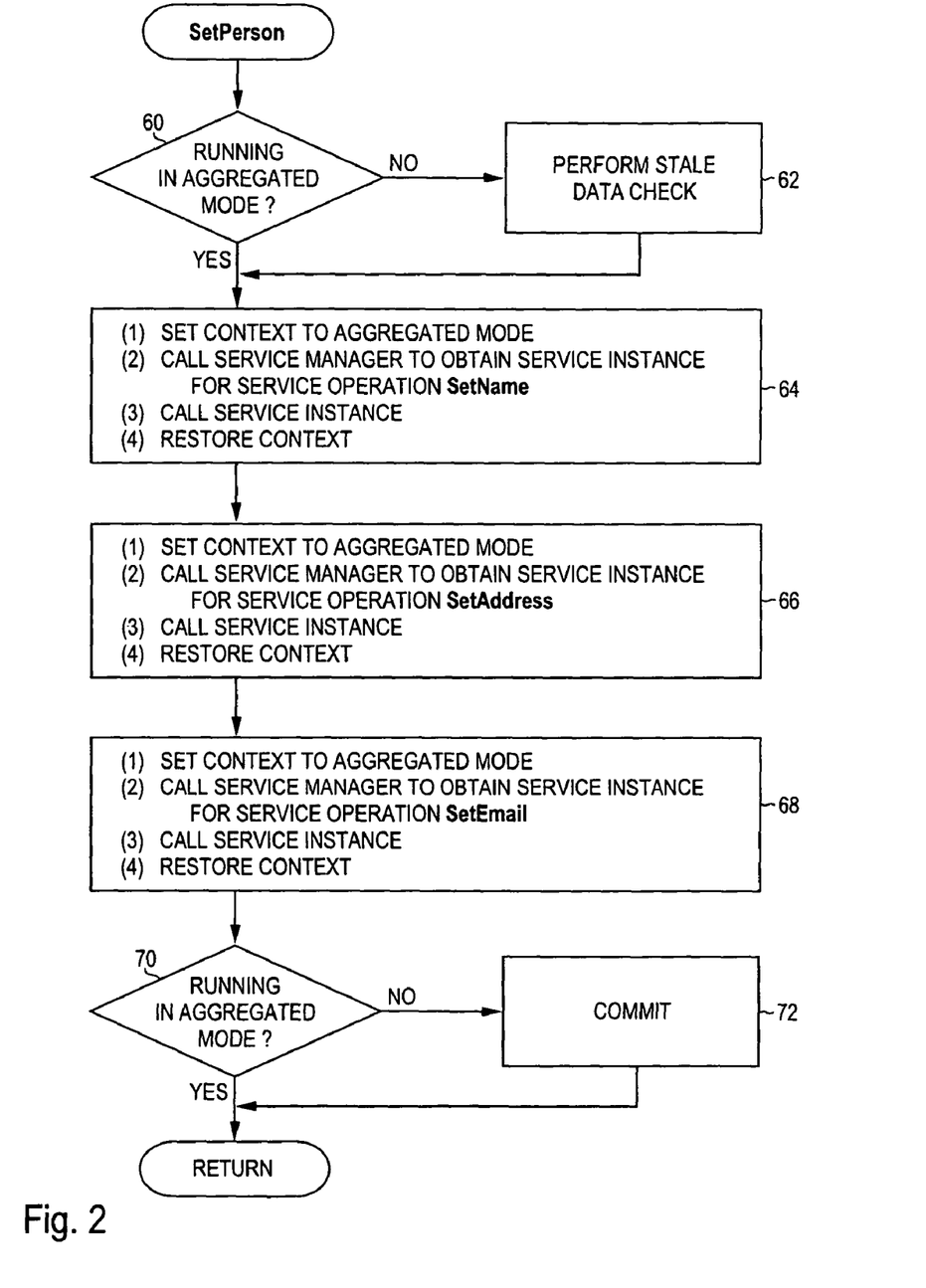
FIG. 2 shows a flow diagram of the processing of a service operation.

FIG. 2 shows a further example of the operation of a service implementation that is aware of the possibility of aggregation. The example shown in FIG. 2 concerns the implementation of an aggregated service operation SetPerson that receives an aggregated service object Person as described above. The service operation SetPerson writes the name, address and email information contained in the incoming service object Person into a persistent data repository. Similarly to the above-described service operation GetPerson, the service operation SetPerson is an aggregated service operation that makes use of low level service operations SetPersonName, SetPersonAddress and SetPersonEmail.

When executing the implementation shown in FIG. 2, first a concurrency management optimization is performed. For this purpose, a check is made in step 60 whether or not the implementation is running in aggregated operation mode. This check involves a call to the service manager 40, which accesses the corresponding data item in the execution context 54. A stale data check is performed in step 62 only if the implementation runs in non-aggregated mode. Otherwise (i.e., if the implementation runs in aggregated mode), no stale data check is necessary because this check has already been completed by the topmost service implementation in the run-time aggregation chain.

In step 64, first the execution context 54 is set to the aggregated mode. Then the service manager 40 is called to obtain a service instance for the SetName service operation. This service instance is then called. After execution of the low level service operation SetName has been completed, the execution context 54 is restored to the previous mode (which may be either the aggregated or the non-aggregated mode).

Step 66 corresponds to step 64, but obtains and calls a service instance for the low level service operation SetAddress instead of SetName. Likewise, step 68 populates the email field using the low level service operation SetEmail. The implementations of the service operations SetName, SetAddress and SetEmail called in steps 64-68 are also programmed to be aware of the possibility of aggregation. These implementations therefore also conduct operation mode checks and appropriate optimizations.

Returning to the flow diagram of FIG. 2, the present operation mode is again checked in step 70 in order to implement the above-described persistence and transaction management optimizations. If the process shown in FIG. 2 runs in the non-aggregated operation mode, then all changes that have been made by the low level service operations SetName, SetAddress and SetEmail are committed in step 72. On the other hand, if the process shown in FIG. 2 runs in the aggregated operation mode (i.e., if it has been called by a higher level service implementation), then the commit operation is deferred to the top level service implementation in the aggregation chain.

It is apparent from the above that the present invention provides a flexible and efficient way of performing service operations.

Developing Service Interfaces

The above specification mainly addressed the run-time processing of service operations in a service oriented architecture. A further aspect of the invention is the definition of service interfaces and, in some embodiments, service implementations when an application for the service oriented data processing architecture is designed or developed. In various embodiments of the present invention, there are a number of provisions for supporting these tasks. Various degrees of automation and interaction with the developer are possible.

Figure 3:
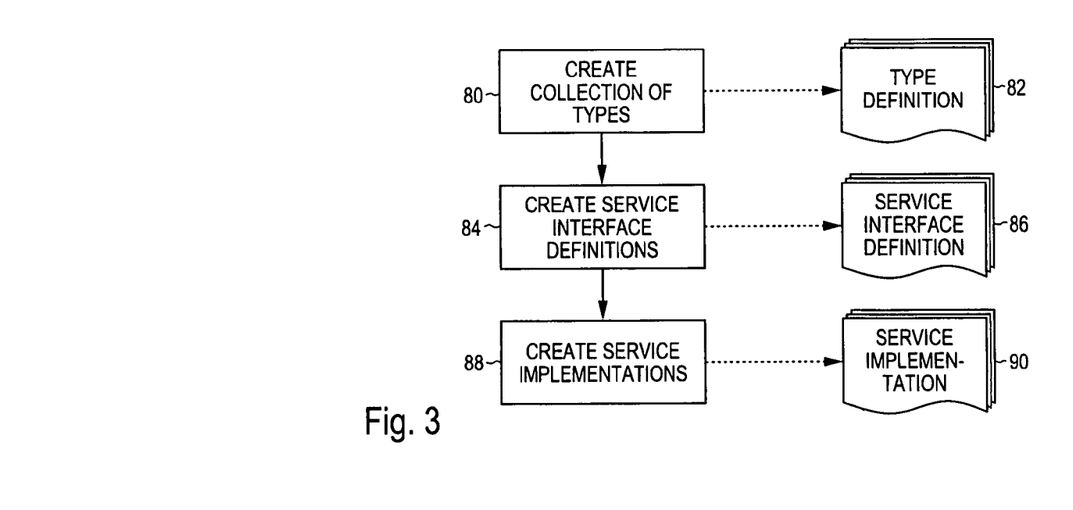
FIG. 3 shows a process of developing a service.

FIG. 3 schematically shows three stages during the development of an application according to an embodiment of the present invention. In a first stage 80, a collection of types for the service objects to be used by the service operations is created. These types will usually include simple and complex (i.e., aggregated) types. The result of the first stage 80 are one or more type definitions 82 that describe the defined types. In the present embodiment, each type definition 82 is an XML Schema (XSD document) that closely conforms to the XML standard; the only deviation from the standard is that the type definition 82 may include an internal identifier.

In simple embodiments, a standard XML/XSD editor may be used to create the type definitions 82. However, in the presently described embodiment, a type definition tool is provided that automatically generates the type definitions 82 from user input. The type definition tool has a graphical user interface that allows the developer to create a hierarchy of types in a convenient fashion.

Figure 4:
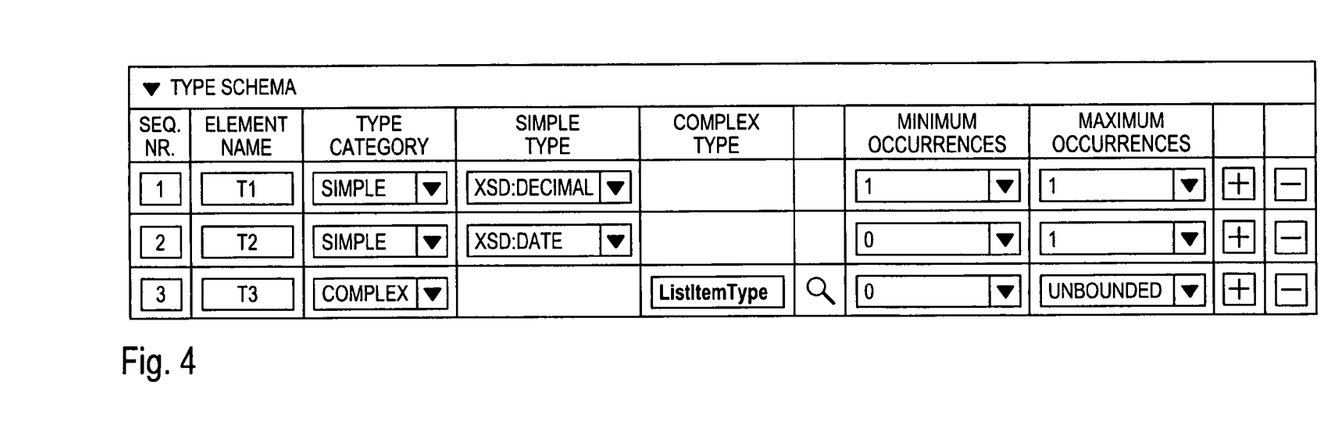
FIG. 4 shows an example of a graphical user interface of a type definition tool.

FIG. 4 shows an example of the user interface of the type definition tool when defining a type schema. In the example, a complex type is defined that has three elements. These elements are (1) a decimal number that must be always present, (2) an optional date, and (3) an arbitrary number of elements of the complex type ListItemType, which is assumed to have been defined previously. The aggregation structure of the complex types defined in the type definition stage 80 usually matches the later defined aggregation structure of the service objects and service operations.

The next stage 84 in the development process concerns the creation of appropriate service interface definitions 86. These service interface definitions 86 will be used in the subsequent development process, and they also define the service interface offered during run-time of the completed application. Each service interface definition 86 concerns one or more service operations, and in particular the service objects used by these service operations. In the present sample embodiment, the service interface definitions 86 are standard-conforming WSDL documents.

Figure 5:
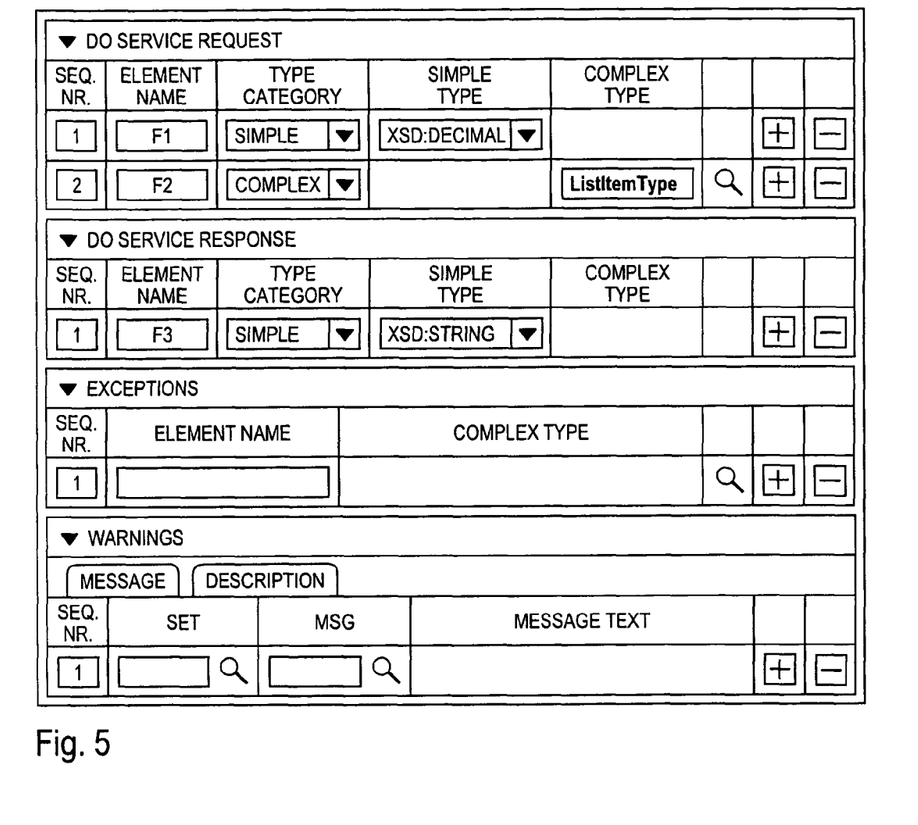
FIG. 5 shows an example of a graphical user interface of an interface definition tool.

An interface definition tool having a graphical user interface is provided in the present sample embodiment for creating the interface definitions 86. FIG. 5 shows an example of a data entry screen used to define the service interface of a particular service operation. The data entry screen defines the elements of the service object expected in the service request as well as the elements of the service object included in the service response. These elements may have a simple type or any of the complex types defined in the previous stage 80. A service interface definition may also comprise information about exceptions and warnings according to the WSDL standard.

The service operation whose interface is defined in the example shown in FIG. 5 is an aggregated service operation because it expects an aggregated service object in the service request. In the present example, this aggregated service object has a first data element that is a decimal number and a second data element that has the type ListItemType. The service operation produces a service response with a low level data object that contains a string as its single data element.

Although the data entry screen shown in FIG. 5 only defines the interface of a service operation, it is implicit that the service operation itself is also an aggregated operation whose aggregation structure matches the aggregation structure of the incoming service object. In other words, an implementation of the service operation is expected to call two lower level service implementations, namely a first one for processing the first data element of the incoming service object and a second one for processing the second data element.

After the type and service interface definitions 82, 86 have been established, the corresponding service implementations 90 are created in the third development phase 88. Again, various degrees of automation are possible.

Figure 6:
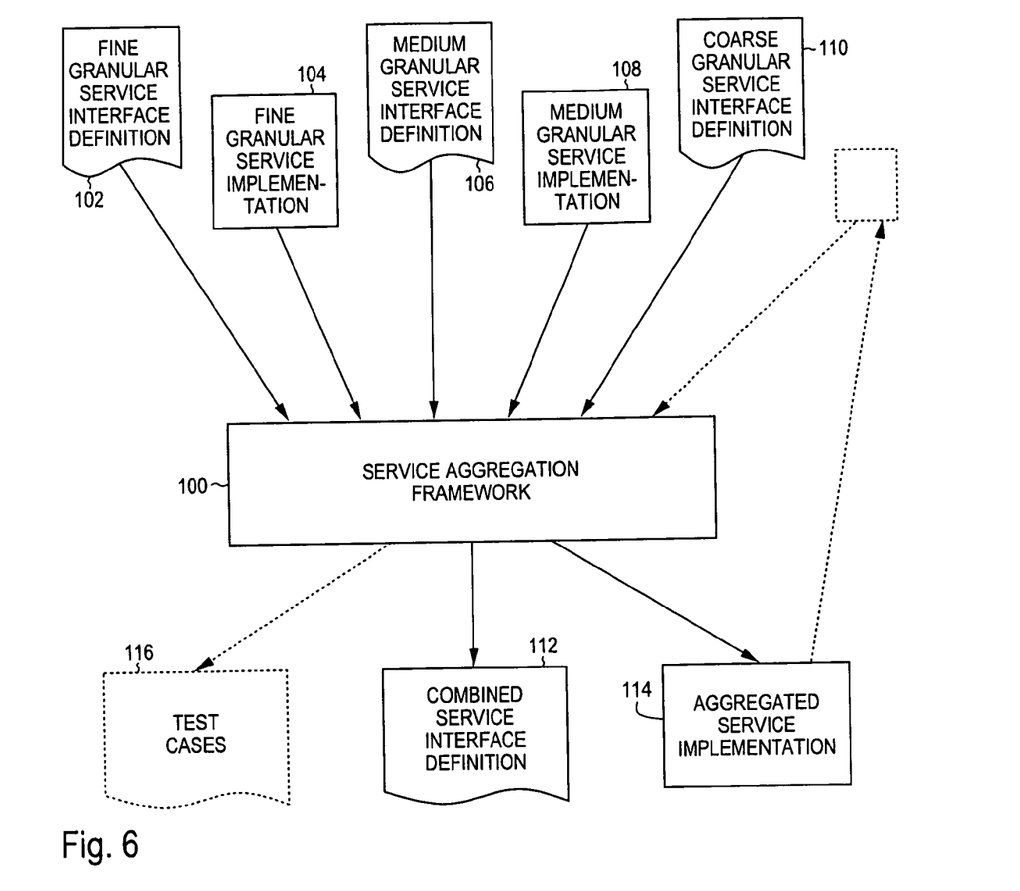
FIG. 6 shows a schematic overview of the input and output data of a service aggregation framework.

In the present sample embodiment, a service aggregation framework 100 as shown in FIG. 6 is provided to support the designer or developer in building a hierarchy of service implementations such as the service implementations 30-38 shown in FIG. 1. The data processed by the service aggregation framework 100 comprises fine granular (i.e., low level or non-aggregated) service interface definitions 102 and service implementations 104 as well as medium granular service interface definitions 106 and service implementations 108. The fine granular service implementations 104 are the basic building blocks that have usually been created by a human programmer. The medium granular service implementations 108 may be the result of a previous aggregation process and may have been generated at least partly in an automatic fashion.

The service aggregation framework 100 further inputs an aggregated coarse granular service interface definition 110 that has been generated during the second phase 84 of the development process. This interface definition 110 specifies the aggregated service objects and operations that may be added to the overall system at the present time.

In the presently described embodiment, the service aggregation framework 100 provides a user interface that shows a tree-like structure of the various service operations defined by the service interface definitions 102, 106, 110. The designer clicks on this tree to select the desired service operations and to define the scope of an aggregation. It is therefore possible to sub-select certain service operations from the (possibly very large) number of service operations that are defined in the service interface definitions 102, 106, 110. This functionality of choosing an appropriate sub-set of service operations is especially important if the service interface definitions 102, 106, 110 contain large pre-defined service operation libraries.

The service aggregation framework 100 processes the above-referenced data according to the user inputs in order to produce a combined service interface definition 112 and an aggregated service implementation 114.

The combined service interface definition 112 comprises the information of the service interfaces of all service operations selected from the service interface definitions 102, 106, 110. The combined service interface definition 112 is used as the service interface definition 22 shown in FIG. 1 during the run-time of the system.

In the presently described embodiment, the automatically generated aggregated service implementation 114 is not yet a fully functional program. However, the aggregated service implementation 114 contains stubs or templates that may be completed manually with comparatively little effort. In particular, the aggregated service implementation 114 contains all elements that are required in the service implementations to support service aggregation.

The aggregated service implementation 114 may be used as an input to the service aggregation framework 100 in a further round of aggregation in order to define even more course granular service operations. This is shown schematically by the dashed box and arrows in FIG. 6.

As mentioned above, the aggregation of service objects and service implementations is usually performed during the design and development of the provider-side service execution framework 26. In some embodiments, however, there may be a just in time (JIT) service aggregation process at run-time.

Various degrees of automation are possible. In some advanced embodiments, the service aggregation framework 100 may generate the aggregated service implementation 114 in a fully automatic fashion, while in other embodiments a considerable amount of manual programming work may be required.

In some embodiments, the service aggregation framework 100 further comprises a functionality for generating test cases 116 for the aggregated service operations in an automatic way.

It is apparent from the above that the present invention greatly supports the development of service interfaces and service implementations in a variety of ways.

Conclusion

The architecture and processes described herein provide mechanisms for performing service operations and developing service interfaces and implementations. All in all, the invention supports the developer or the user in defining service interfaces that have an optimum granularity to support the particular needs for an application in a service oriented architecture. Some embodiments of the invention are tailored to facilitate the process of reusing existing service implementations in a systematic way. There are also embodiments of the invention that allow the developer or user to leverage existing service objects in a systematic way. In some embodiments, the invention reduces the overhead of service invocations by eliminating repetitive persistence, transaction and/or concurrency management tasks. The performance of a service oriented architecture is therefore improved in these embodiments. Finally, the invention reduces the overall maintenance costs of a system which has been developed using the invention or in which the invention is implemented.

Hardware Overview

Figure 7:
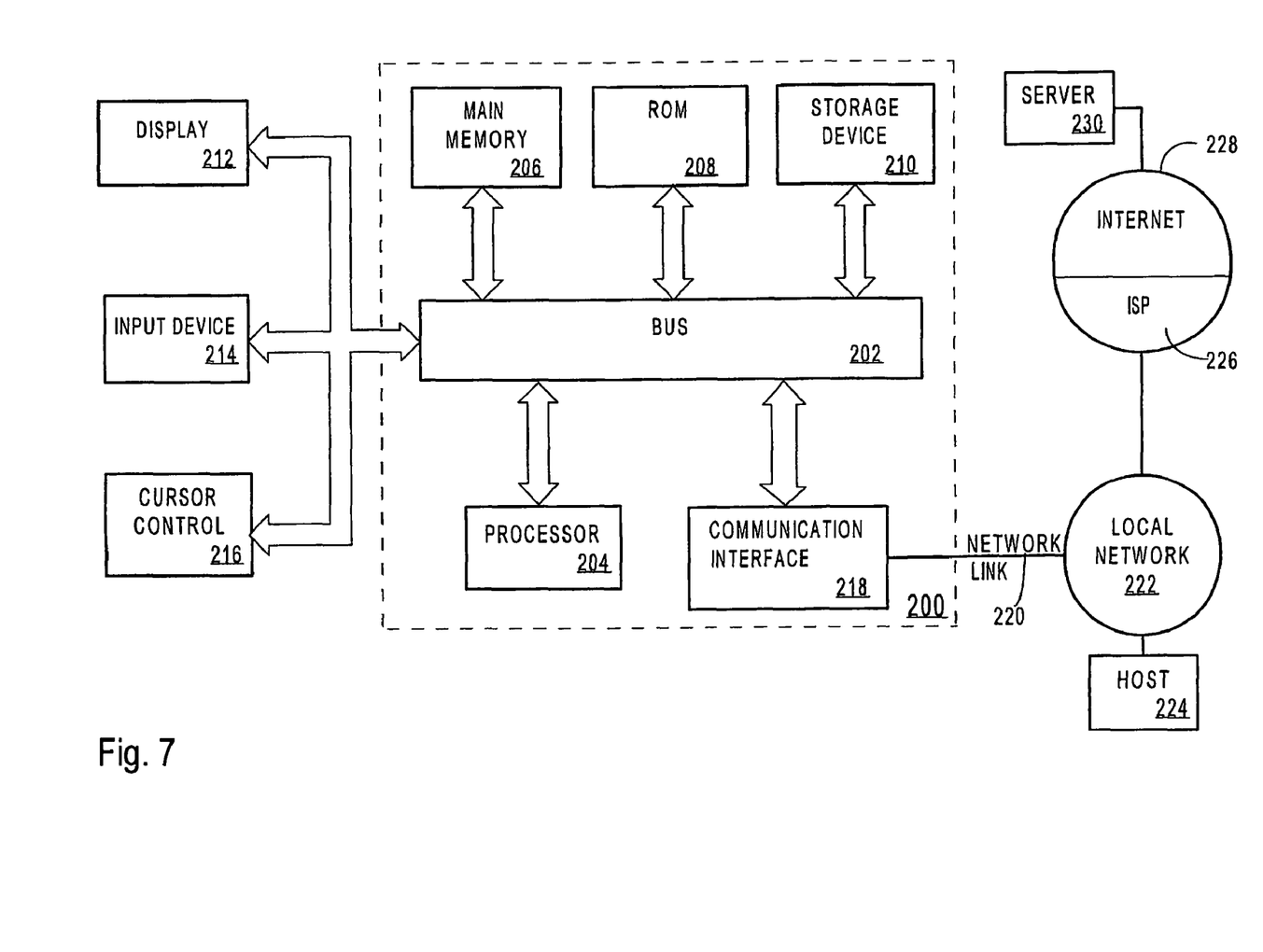
FIG. 7 shows a block diagram that illustrates a computer system upon which an embodiment of the invention may be implemented.

FIG. 7 is a block diagram that illustrates a computer system 200 upon which an embodiment of the invention may be implemented. Computer system 200 may be used for implementing the service provider 10 and/or the service requestor 12 and/or the registry 24 shown in FIG. 1.

Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing a service request by a service provider, the method comprising:
    receiving the service request at the service provider, and
    wherein the service provider includes a plurality of service implementations;
    wherein the plurality of service implementations include a first service implementation and a second service implementation;
    wherein each of the first service implementation and the second service implementation has a first mode and a second mode;
    when executing in the first mode, each service implementation performs a management function in addition to generating a service object;
    when executing in the second mode, each service implementation generates a service object without performing the management function;
    in response to receiving the service request, executing the first service implementation in the first mode;

while executing in the first mode to process the service request, the first service implementation calling the second service implementation;

in response to the first service implementation calling the second service implementation, executing the second service implementation in the second mode;

while executing in the second mode in response to being called by the first service implementation, the second service implementation generating a first service object; and based, at least in part, on the first service object, the first service implementation generating a second service object while executing in the first mode; and returning a service response to a service requestor based on the second service object;

wherein the method is performed by one or more computing devices.

2. The method of claim 1, further comprising:

receiving a further service request at the service provider, and processing the further service request by the second service implementation in the first mode.

3. The method of claim 1, further comprising calling a service manager to determine whether a service implementation is executed in the first or the second mode.

4. The method of claim 1, wherein the first service implementation is one of an aggregated and a non-aggregated service implementation, and the second service implementation is a non-aggregated service implementation.

5. The method of claim 1, wherein the first mode is a non-aggregated operation mode, and the second mode is an aggregated operation mode.

6. The method of claim 1, wherein the management function includes performing one or more persistence operations that modify data residing in persistent storage.

7. The method of claim 1, wherein the management function includes checking for stale data.

8. The method of claim 1, wherein the management function includes managing whether a transaction commits.

9. A non-transitory computer-readable medium storing one or more sequences of instructions which, when executed by one or more processors, causes the one or more processors to perform the method comprising:

receiving a service request at a service provider, and wherein the service provider includes a plurality of service implementations;

wherein the plurality of service implementations include a first service implementation and a second service implementation;

wherein each of the first service implementation and the second service implementation has a first mode and a second mode;

when executing in the first mode, each service implementation performs a management function in addition to generating a service object;

when executing in the second mode, each service implementation generates a service object without performing the management function;

in response to receiving the service request, executing the first service implementation in the first mode;

while executing in the first mode to process the service request, the first service implementation calling the second service implementation;

in response to the first service implementation calling the second service implementation, executing the second service implementation in the second mode;

while executing in the second mode in response to being called by the first service implementation, the second service implementation generating a first service object; and based, at least in part, on the first service object, the first service implementation generating a second service object while executing in the first mode; and returning a service response to a service requestor based on the second service object.

10. The non-transitory computer-readable medium of claim 9, wherein the one or more sequences of instructions when executed by one or more processors further cause:

receiving a further service request at the service provider; and processing the further service request by the second service implementation in the first mode.

11. The non-transitory computer-readable medium of claim 9, wherein the one or more sequences of instructions when executed by one or more processors further cause calling a service manager to determine whether a service implementation is executed in the first or the second mode.

12. The non-transitory computer-readable medium of claim 9, wherein the first service implementation is one of an aggregated and a non-aggregated service implementation, and the second service implementation is a non-aggregated service implementation.

13. The non-transitory computer-readable medium of claim 9, wherein the first mode is a non-aggregated operation mode, and the second mode is an aggregated operation mode.

14. The non-transitory computer-readable storage medium of claim 9, wherein the management function includes performing one or more persistence operations that modify data residing in persistent storage.

15. The non-transitory computer-readable medium of claim 9, wherein the management function includes checking for stale data.

16. The non-transitory computer-readable medium of claim 9, wherein the management function includes managing whether a transaction commits.

* * * * *

UNITED STATES PATENT AND TRADEMARK OFFICE
CERTIFICATE OF CORRECTION

PATENT NO. : 7,831,982 B2  Page 1 of 1
APPLICATION NO. : 11/280847
DATED : November 9, 2010
INVENTOR(S) : Dmitri Smirnov et al.

It is certified that error appears in the above-identified patent and that said Letters Patent is hereby corrected as shown below:

In column 14, line 44, in claim 14, after "readable" delete "storage".

Signed and Sealed this
Second Day of August, 2011

David J. Kappos
*Director of the United States Patent and Trademark Office*